Patented Jan. 7, 1936

2,027,206

UNITED STATES PATENT OFFICE 2,027,206

AZO DYE AND METHOD FOR ITS PREPARATION

Francis Hervey Smith, Woodstown, N. J., and Crayton Knox Black, Wilmington, Del., assignors to E. I. du Pont de Nemours & Company, Wilmington, Del., a corporation of Delaware No Drawing. Application August 4, 1932, Serial No. 627,464

21 Claims. (Cl. 260—70)

This invention relates to new azo dyes and more particularly refers to tetrakisazo dyes especially adapted for dyeing leather.

Formerly, when it was desired to impart certain shades to leather, particularly the various shades of brown, it was necessary to use a mixture of dyes. This resulted in the production of uneven colors which were also quite unstable.

It is an object of this invention to produce dyes which may be used for dyeing leather in uniform shades, particularly the various shades of brown, without the necessity of using a mixture of dyes. A still further object is to produce dyes which impart exceptionally stable colors to leather. A still further object is to produce dyes which are suitable for dyeing wool and other material. Additional objects will appear hereinafter.

These objects are attained by the present invention wherein a tetrakisazo dye of the following general formula is produced:

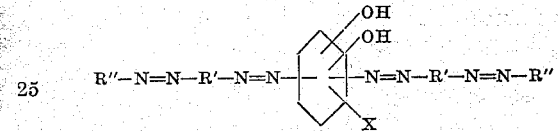

In this formula R' and R'' represent aryl groups and X represents groups such as halogen, alkyl, alkoxy, nitro, carboxyl, sulfonic, hydroxyl, and hydrogen. These compounds are produced by coupling two equivalents of a diazotized mono-acyl-diamino or nitro-amino derivative of an aromatic compound with a dihydroxy benzene, treating the resulting compound to convert the mono-acyl-amino or nitro groups to amino groups, then diazotizing and coupling with two equivalents of an aromatic coupling component.

The invention will be more completely understood by reference to the following examples in which the quantities are stated in parts by weight:

Example 1

39.8 parts of picramic acid were diazotized with 18 parts of 100% hydrochloric acid and 13.8 parts of sodium nitrite in the usual way. 11 parts of resorcin were dissolved in 100 parts of water and 20 parts of sodium hydroxide added. The picramic acid diazo was added maintaining a temperature of 10–15° C. Coupling was rapid. After stirring one hour hydrochloric acid was added until the solution was slightly acid to Congo red paper. Freshly slaked lime was added until the solution was alkaline to brilliant yellow paper and the dye heated to 95° C. A solution of 31.8 parts of Ca(SH)₂ was added and the temperature maintained at 95° C. for two hours. The dye was filtered without the addition of salt and reslurried in 600 parts of water. 18 parts of 100% hydrochloric acid were added and the combination tetrazotized with 13.8 parts of sodium nitrite at 20° C. for one hour. A solution of 40 parts of meta-phenylene-diamine-sulfonic acid in 400 parts of water were added and then sodium acetate until the mixture was no longer acid to Congo red paper. The dye was stirred one hour and filtered cold after salting 10% by volume.

The dry dye was a black powder which dissolved in water to give a yellow-brown solution and in concentrated sulfuric acid to give a red-brown solution.

It dyed leather a dark red-brown.

Its probable formula is as follows:

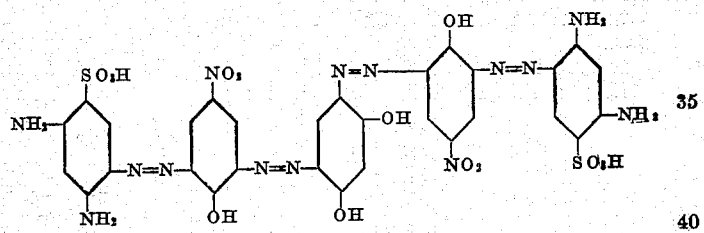

On reducing with sodium hydrosulfite the following compounds are obtained:
2,4,6-triamino-phenol
2,4,5-triamino-benzene sulfonic acid
2,4-diamino-resorcin.

Example 2

21.8 parts of p-nitroaniline-o-sulfonic acid were diazotized in the usual manner with 9 parts of 100% hydrochloric acid and 6.9 parts of sodium nitrite. 11 parts of resorcin dissolved in 100 parts of water were added and sodium acetate added until no test was obtained on Congo red paper. When coupling was complete the solution was made alkaline with 20 parts of sodium hydroxide and the diazo body from 19.9 parts of picramic acid was added. When coupling was complete the dye was reduced, tetrazotized and coupled to M. P. D. sulfonic acid as in Example 1.

The dry dye was a black powder which dissolved in water to give a red-brown solution and in concentrated sulfuric acid to give a blue solution.

It dyes leather a red-brown.

Its probable formula is as follows:

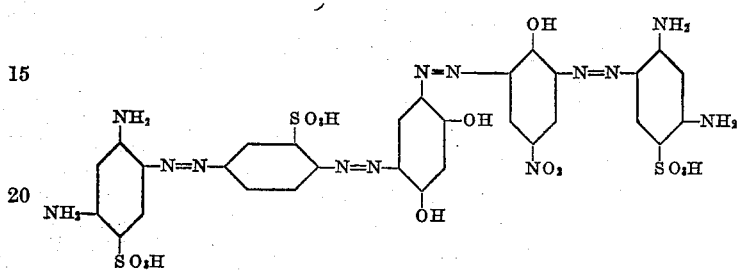

On reducing with sodium hydrosulfite the following compounds are obtained:
2,4,6-triamino-phenol
2,4-diamino-resorcin
2,4,5-triamino-benzene sulfonic acid
p-phenylene-diamine-sulfonic acid

Example 3

60 parts of sulfo-phenyl-methyl-pyrazolone were substituted for the 40 parts of meta-phenylene-diamine-sulfonic acid in Example 1.

The dry dye was a black powder which dissolved in water to give a brown solution and in concentrated sulfuric acid to give a brown solution.

It dyed leather a red-brown.

Its probable formula is as follows:

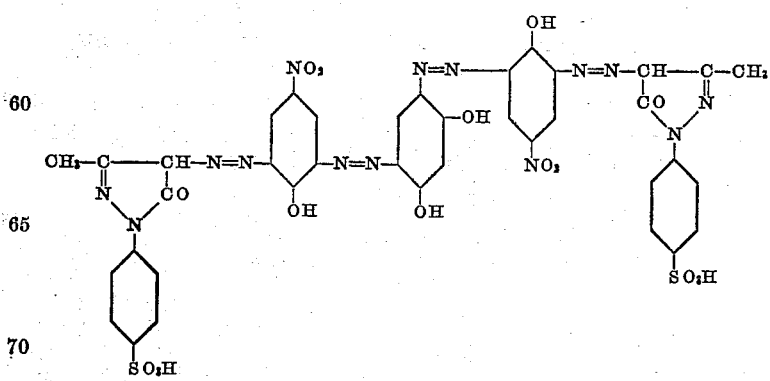

On reducing with sodium hydrosulfite the following compounds are obtained:
2,4-diamino-resorcin
2,4,6-triamino-phenol
Amino-sulfo-phenyl-methyl-pyrazolone

Example 4

65 parts of R-salt dissolved in excess soda ash solution were substituted for the 40 parts of meta-phenylene-diamine-sulfonic acid in Example 1. No sodium acetate was used in the last coupling.

The dry dye was a black powder which dissolved in water to give a blue solution and in concentrated acid to give a violet solution.

It dyed leather a blue-black.

Its probable formula is as follows:

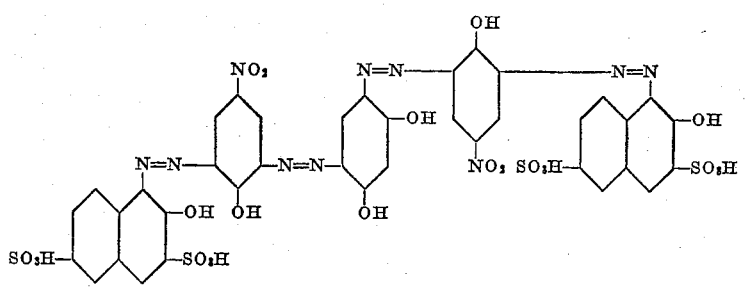

On reducing with sodium hydrosulfite the following compounds are obtained:
Amino-R-salt
2,4,6-triamino-phenol
2,4-diamino-resorcin

Example 5

75 parts of H-acid were substituted for the 40 parts of meta-phenylene-diamine-sulfonic acid in Example 1.

The dry dye was a black powder which dissolved in water to give a blue solution and in concentrated sulfuric acid to give a violet solution.

It dyed leather black.

Its probable formula is as follows:

in concentrated sulfuric acid to give a violet solution.

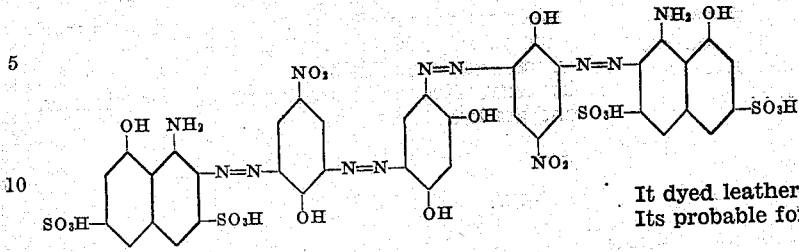

On reducing with sodium hydrosulfite the following compounds are obtained:
Amino-H-acid
2,4,6-triamino-phenol
2,4-diamino-resorcin

Example 6

15.2 grams of b-resorcylic acid were substituted for the 11 parts of resorcin in Example 1.

The dry dye was a black powder which dissolved in water to give a yellow-brown solution and in concentrated sulfuric acid to give a red-brown solution.

It dyed leather a red-brown.
Its probable structural formula is as follows:

It dyed leather a red-brown.
Its probable formula is as follows:

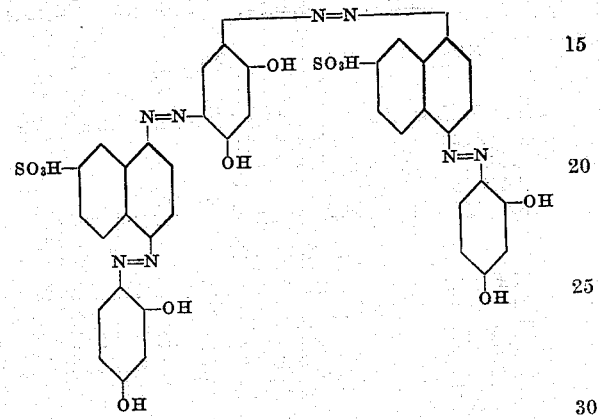

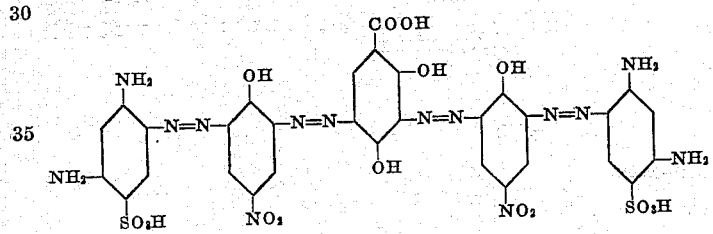

On reducing with sodium hydrosulfite the following compounds are obtained:
2,4,6-triamino-phenol
2,4,5-triamino-benzene-sulfonic acid
2,4-dihydroxy-3,5-diamino-benzoic acid On reducing with sodium hydrosulfite the following products are obtained:
2,4-diamino-resorcin
1,4-diamino-naphthalene-7-sulfonic acid
Amino-resorcin

Example 7

56 parts of acetyl-amino-1,4,7-Cleve's acid were diazotized in the usual manner. 22 parts of resorcin dissolved in 200 parts of water were added and then sodium acetate was added until the solution was neutral to Congo red paper. When coupling was complete, the solution was made alkaline to brilliant yellow with sodium hydroxide and heated to 90° C. for 30 minutes. When saponification was complete the solution was cooled and diazotized with 18 parts of hydrochloric acid and 13.8 parts of sodium nitrite. 11 parts of resorcin in 100 parts of water were made strongly alkaline with 20 parts of sodium hydroxide and the diazo body added. Coupling was rapid. The solution was salted 10% by volume and filtered cold.

The dry dye was a black powder which dissolved in water to give a red-brown solution and

Example 8

19 parts of 2,4-dihydroxy-benzene sulfonic acid were substituted for the 11 parts of resorcin in Example 1.

The dry dye was a black powder which dissolved in water to give a yellow-brown solution and in concentrated sulfuric acid to give a red-brown solution.

It dyed leather a yellow-brown.
Its probable formula is as follows:

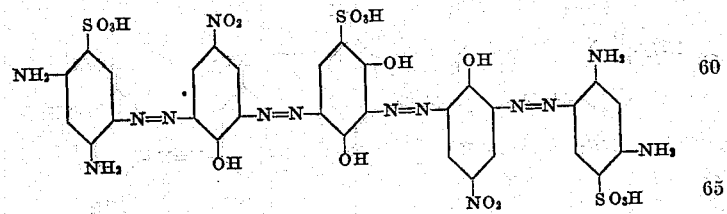

On reducing with sodium hydrosulfite the following compounds are obtained:
2,4,6-triamino-phenol
2,4,5-triamino-benzene sulfonic acid
2,4-dihydroxy-3,5 - diamino - benzene sulfonic acid

Example 9

14.5 parts of 1,3-dihydroxy-4-chlorobenzene were substituted for the 11 parts of resorcin in Example 1.

The dry dye was black powder which dissolved in water to give a yellow-brown solution and in concentrated sulfuric acid to give a red-brown solution. It dyed leather a dark-brown.

Its probable formula is as follows:

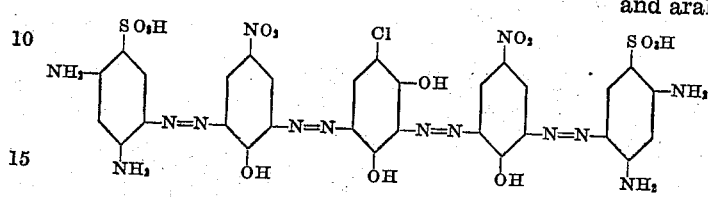

On reducing with sodium hydrosulfite the following compounds are obtained:
2,4,6-triamino-phenol
2,4,5-triamino-benzene sulfonic acid
2,4-dihydroxy-3,5-diamino-1-chlorobenzene

Example 10

12.5 parts of orcinol were substituted for the 11 parts of resorcin in Example 1.

The dry dye was a black powder which dissolved in water to give a yellow-brown solution and in concentrated sulfuric acid to give a red-brown solution.

It dyed leather a dark-brown.

Its probable formula is as follows:

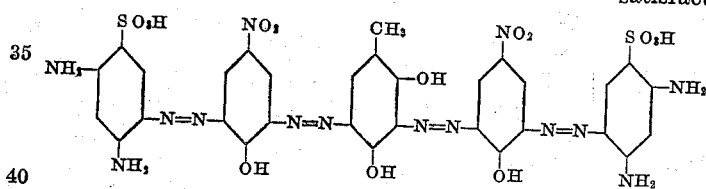

On reducing with sodium hydrosulfite the following compounds are obtained:
2,4,6-triamino-phenol
2,4,5-triamino-benzene sulfonic acid
2,4-dihydroxy-3,5-diamino-toluene

Example 11

11.0 parts of 1,2-dihydroxy-benzene were substituted for the 11.0 parts of resorcin in Example 1.

The dry dye is a black powder which dissolves in water to give a yellow-brown solution and in concentrated sulfuric acid to give a red-brown solution.

It dyes leather a yellow-brown.

Its probable formula is as follows:

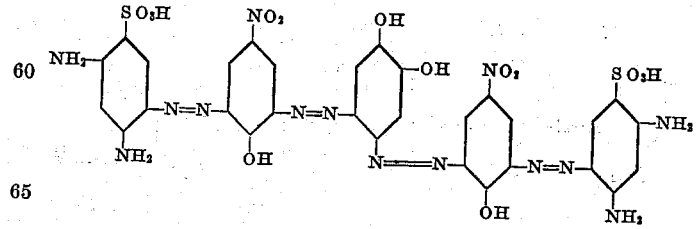

On reducing with sodium hydrosulfite the following compounds are obtained:
2,4,6-triamino-phenol
2,4,5-triamino-benzene-sulfonic acid
1,2-dihydroxy-4,5-diamino-benzene In carrying out the process of the present invention in addition to the compounds used in the above examples for the components represented by R' and R'', numerous other compounds may be substituted therefor. For instance, members of the benzene, naphthalene, anthracene, diphenyl, phenyl-naphthyl, dinaphthyl, and carbazole series may be used. These members may have substituted thereon various groups among which are the following: halogen, alkyl, alkoxy, hydroxy, nitro, amide, carboxyl, sulfonic, aryloxy, and aralkyl.

In selecting the components represented by R', it is advisable to use nitro-amino or mono-acyl-diamino derivatives of the compounds previously referred to. After diazotization and coupling of these components the nitro or mono-acyl-amino group is converted to the amino group by methods well known to one skilled in the art. For example, to produce the amino group the nitro group may be reduced with calcium sulfhydrate and the mono-acyl-amino group may be treated with sodium hydroxide. It is, of course, understood that these methods are used merely for purposes of illustration, since any of the various other well known methods may also be used with satisfactory results.

It is also to be understood that the components represented by R' may be dissimilar. Likewise, the components represented by R'' may be dissimilar. The means for attaining this result are also well known, one of them being described for purposes of illustration in Example 2.

In addition to the aromatic compounds previously referred to as suitable for the components represented by R'' other compounds may be used, such as pyrazolones, acyl-acetarylides, or other components of the general formula:

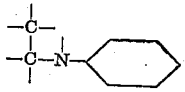

Among the components which may be used for R'' are the following:

β-Naphthol
α-Naphthol
2-Naphthol-6-sulfonic acid
2-Naphthol-8-sulfonic acid
2-Naphthol-5-sulfonic acid
2-Naphthol-7-sulfonic acid 2-Naphthol-3,7-disulfonic acid
2-Naphthol-4,8-disulfonic acid
2-Naphthol-6,8-disulfonic acid
2-Naphthol-3,6,8-trisulfonic acid
1-Naphthol-2-sulfonic acid
1-Naphthol-4-sulfonic acid
1-Naphthol-5-sulfonic acid
1,6-Cleve's acid
1,7-Cleve's acid
Naphthionic acid
Phenyl-methyl-pyrazolone
Chlor-sulfo-phenyl-methyl-pyrazolone
Aceto-acetanilide
Aceto-acet-ortho-chlor-anilide
Methyl indole
1-Naphthol-3,6,8-trisulfonic acid
α-Naphthylamine
β-Naphthylamine
1-Amino-5-naphthol-7-sulfonic acid
1-Amino-7-naphthol-3-sulfonic acid
1-Amino-8-naphthol-4-sulfonic acid
1-Amino-8-naphthol-6-sulfonic acid
2-Amino-3-naphthol-6-sulfonic acid
2-Amino-5-naphthol-7-sulfonic acid
2-Amino-7-naphthol-3-sulfonic acid
β-Hydroxy-naphthoic acid
J-acid urea
p-Amino-benzoyl-J-acid
Phenyl-J-acid
Salicyclic acid Other substituted dihydroxy-benzenes may be used in place of those mentioned in the above examples. Among these substituted dihydroxy benzenes are the following:

Dihydroxy-nitro-benzenes
Dihydroxy-anisidines or phenetidines
Dihydroxy-brom-benzenes
Dihydroxy-fluor-benzenes The products of the present invention are exceptionally well adapted for dyeing leather, since they produce uniform stable colors, particularly the various shades of brown, without the necessity of mixing with other dyes. These colors are greatly superior to those formerly produced from mixed dyes. In addition, the products may be used for dyeing wool and for many other purposes.

As many apparent and widely different embodiments of this invention may be made without departing from the spirit thereof it is to be understood that we do not limit ourselves to the foregoing examples or descriptions except as indicated in the following patent claims.

We claim:

1. A process for producing azo dyes which comprises coupling two equivalents of a diazotized member selected from the group consisting of mono-acyl-diamino and nitro-amino derivatives of an aromatic compound with a dihydroxy-benzene, treating the resulting compound to convert the mono-acyl-amino or nitro groups to amino groups, then tetrazotizing the product and coupling it with two equivalents of an aromatic coupling component.

2. A process for producing azo dyes which comprises coupling two equivalents of a diazotized member selected from the group consisting of mono-acyl-diamino and nitro-amino derivatives of an aromatic compound with resorcin, treating the resulting compound to convert the mono-acyl-amino or nitro groups to amino groups, then tetrazotizing the product and coupling it with two equivalents of an aromatic coupling component.

3. The process of claim 1 wherein the dihydroxy-benzene is coupled with dissimilar components and the resulting product is coupled with components which may be dissimilar.

4. A process for producing azo dyes which comprises coupling two equivalents of a diazotized member selected from the group consisting of mono-acyl-diamino and nitro-amino derivatives of an aromatic compound of the benzene series with a dihydroxy-benzene, treating the resulting compound to convert the mono-acyl-amino or nitro groups to amino groups, then tetrazotizing the product and coupling it with two equivalents of an aromatic coupling component.

5. A process for producing azo dyes which comprises coupling two equivalents of a diazotized member selected from the group consisting of mono-acyl-diamino and nitro-amino derivatives of an aromatic compound with a dihydroxy-benzene, treating the resulting compound to convert the mono-acyl-amino or nitro groups to amino groups, then tetrazotizing the product and coupling it with two equivalents of an aromatic coupling component of the benzene series.

6. A process for producing azo dyes which comprises coupling two equivalents of a diazotized member selected from the group consisting of mono-acyl-diamino and nitro-amino derivatives of an aromatic compound of the benzene series with a dihydroxy-benzene, treating the resulting compound to convert the mono-acyl-amino or nitro groups to amino groups, then tetrazotizing the product and coupling it with two equivalents of an aromatic coupling component of the benzene series.

7. A process for producing azo dyes which comprises coupling two equivalents of a diazotized member selected from the group consisting of mono-acyl-diamino and nitro-amino derivatives of an aromatic compound of the benzene series with resorcin, treating the resulting compound to convert the mono-acyl-amino or nitro groups to amino groups, then tetrazotizing the product and coupling it with two equivalents of an aromatic coupling component of the benzene series.

8. A process for producing azo dyes which comprises coupling two equivalents of diazotized picramic acid with resorcin, reducing the nitro groups of the resulting compound to amino groups, then tetrazotizing the product and coupling it with two equivalents of an aromatic coupling component of the benzene series which has auxochrome groups substituted thereon.

9. A process for producing an azo dye which comprises coupling two equivalents of diazotized picramic acid with resorcin, reducing the nitro groups of the resulting compound to amino groups, then tetrazotizing the product and coupling it with two equivalents of meta-phenylene-diamine-sulfonic acid.

10. A process for producing an azo dye which comprises coupling two equivalents of diazotized para-nitro-aniline-ortho-sulfonic acid with resorcin, reducing the nitro groups of the resulting compound to amino groups, then tetrazotizing the product and coupling it with two equivalents of meta-phenylene-diamine-sulfonic acid.

11. A process for producing an azo dye which comprises coupling two equivalents of diazotized picramic acid with beta resorcylic acid, reducing the nitro groups of the resulting compound to amino groups, then tetrazotizing the product and coupling it with two equivalents of meta-phenylene-diamine-sulfonic acid.

12. Azo dyes having the following general formula:

R''—N=N—R'—N=N—X—N=
$$N—R'—N=N—R''$$

wherein R'' represents the radical of an aromatic coupling component, R' represents the radical of an aromatic amine of the benzene series, and X represents the radical of a dihydroxy-benzene.

13. Azo dyes having the following general formula:

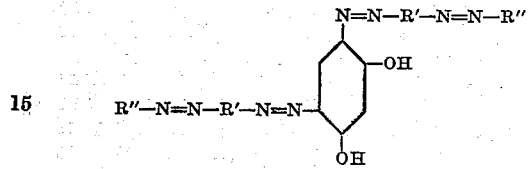

wherein R'' represents the radical of an aromatic coupling component and R' represents the radical of an aromatic amine of the benzene series.

14. The product of claim 9 wherein the components represented by R' are dissimilar and the components represented by R'' may be dissimilar.

15. Azo dyes having the following general formula:

R''—N=N—R'—N=N—X—N=
$$N—R'—N=N—R''$$

wherein R'' represents the radical of an aromatic coupling component of the benzene series, R' represents the radical of an aromatic amine of the benzene series, and X represents the radical of a dihydroxy-benzene.

16. Azo dyes having the following general formula:

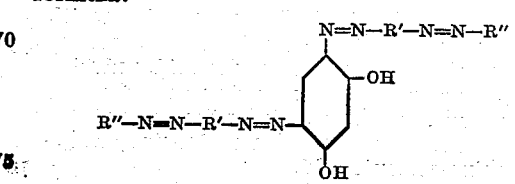

wherein R'' represents the radical of an aromatic coupling component of the benzene series and R' represents the radical of an aromatic amine of the benezene series.

17. Azo dyes having the following general formula:

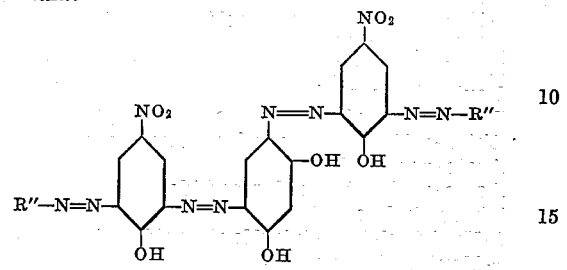

wherein R'' represents the radical of an aromatic coupling component of the benzene series which has auxochrome groups substituted thereon.

18. Tetrakisazo dyes having the following general formula:

R''—N=N—R'—N=N—X—N=
$$N—R'—N=N—R''$$

wherein R'' represents the radical of a coupling component, R' represents the radical of an aromatic amine of the benzene series, and X represents the radical of a dihydroxy-benzene, said dye containing at least two sulfonic or carboxylic acid groups.

19. A tetrakisazo dye having the following formula:

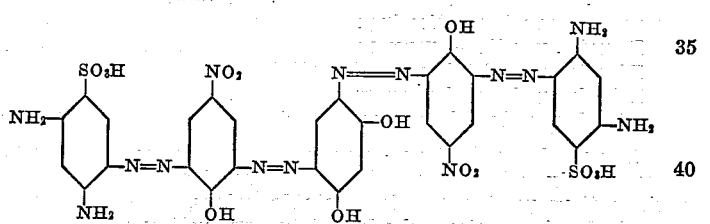

20. A tetrakisazo dye having the following formula:

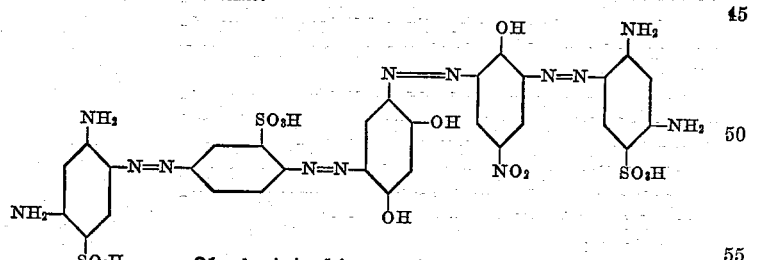

21. A tetrakisazo dye having the following formula:

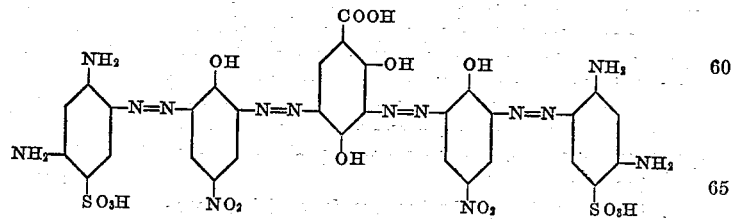

FRANCIS HERVEY SMITH.
CRAYTON KNOX BLACK.

CERTIFICATE OF CORRECTION.

Patent No. 2,027,206.

January 7, 1936.

FRANCIS HERVEY SMITH, ET AL.

It is hereby certified that error appears in the printed specification of the above numbered patent requiring correction as follows: Page 6, first column, line 21, claim 14, for the numeral "9" read 12; and that the said Letters Patent should be read with this correction therein that the same may conform to the record of the case in the Patent Office.

Signed and sealed this 31st day of March, A. D. 1936.

(Seal)

Leslie Frazer
Acting Commissioner of Patents.